United States Patent [19]

Kawada et al.

[11] 4,353,023

[45] Oct. 5, 1982

[54] OPERATION CONTROL APPARATUS FOR AC MOTORS

[75] Inventors: Shigeki Kawada, Hino; Hiroshi Ishida, Hamuramachi, both of Japan

[73] Assignee: Fujitsu Fanuc Limited, Tokyo, Japan

[21] Appl. No.: 176,508

[22] Filed: Aug. 8, 1980

[30] Foreign Application Priority Data

Aug. 16, 1979 [JP] Japan ................ 54-104443

[51] Int. Cl.$^3$ ............................................. H02P 3/18
[52] U.S. Cl. ..................... 318/762; 318/803; 318/808
[58] Field of Search ........ 318/757, 762, 803, 807–811; 363/57, 58, 137, 138

[56] References Cited

U.S. PATENT DOCUMENTS

| | | | |
|---|---|---|---|
| 4,019,117 | 4/1977 | Gehm et al. | 363/138 |
| 4,139,885 | 2/1979 | Overzet et al. | 363/58 |
| 4,281,378 | 7/1981 | Ogino et al. | 363/57 |

Primary Examiner—David Smith, Jr.
Attorney, Agent, or Firm—Staas & Halsey

[57] ABSTRACT

An apparatus for controlling the operation of an AC motor wherein braking energy at the time of a reduction in motor speed is disposed of by regenerative braking. The apparatus includes a rectifier connected to the AC power source, a smoothing capacitor, a variable-voltage variable-frequency inverter, and a regenerative thyristor bridge circuit connected between the inverter and the rectifier through switching transistors. There is also provided a firing control circuit for controlling the firing of each thyristor in the thyristor bridge circuit and for controlling driving of the switching transistors in synchronism with the firing of the thyristors, the braking energy being fed back to the AC power source when the AC motor undergoes a reduction in speed. The apparatus is small and can be constructed simply and inexpensively.

11 Claims, 4 Drawing Figures

OPERATION CONTROL APPARATUS FOR AC MOTORS

CROSS REFERENCE TO RELATED APPLICATION

This application is related to our copending application Ser. No. 176,337, filed Aug. 8, 1980 entitled *OPERATION CONTROL APPARATUS FOR AC MOTORS*, now U.S. Pat. No. 4,319,177.

BACKGROUND OF THE INVENTION

This invention relates to an apparatus for controlling the operation of an AC motor, and more particularly to an AC motor operation control apparatus having improved circuitry for regenerative braking.

AC motors, and induction motors in particular, are employed in a variety of industrial fields. The kinds of loads that can be driven by these motors are equally diverse. Some induction motors, for example, undergo rapid and frequent increases and decreases in speed, while in others there are positive and negative changes in load torque so as to permit the raising and lowering of an object in the manner of a hoist. Thus, there is a requirement that an AC motor functioning as a driving source be operated so as to generate a positive torque as well as a braking torque.

A method of controlling the operation of AC motors, which has recently come into fairly widespread use, employs a variable-voltage variable-frequency inverter. While no major projects are encountered in this method when operating the motor in the driving mode, one difficulty which does arise is the difficulty in dealing with the rotational energy possessed by the rotor of the motor when it is to be operated in the braking mode at the time of a reduction in speed. Two exemplary methods of dealing with this rotational energy have been adopted in the prior art. In one method the flow of current to the AC motor is interrupted at braking time to permit the motor to slow down naturally due to mechanical loss attributed to the load. In the other method the slip which arises at the time of the speed reduction is suitably controlled and is allowed to dissipate within the motor. The first method, however, requires too much time to achieve the speed reduction and has a very poor control response, while the second method causes the motor to overheat to such an extent that it cannot endure frequent increases and decreases in speed. Another method which can be mentioned is one in which the rotational energy of the rotor is dissipated by allowing a smoothing capacitor, inserted in the inverter circuitry mentioned above, to charge until the charged voltage exceeds a specified value, whereupon the capacitor is discharged through a braking resistor connected in parallel with the inverter circuit, thereby to dissipating the energy. However, this method is disadvantageous in that it may lead to destruction of the apparatus if the smoothing capacitor is allowed to charge to an excessively high value. This method is also expensive since the braking resistor increases in size and cost in accordance with the size of the machine to be driven by the motor. Moreover, the method is undesirable in terms of enhancing efficiency because of the fact that the braking energy is wasted in the form of thermal loss.

Figure 1:
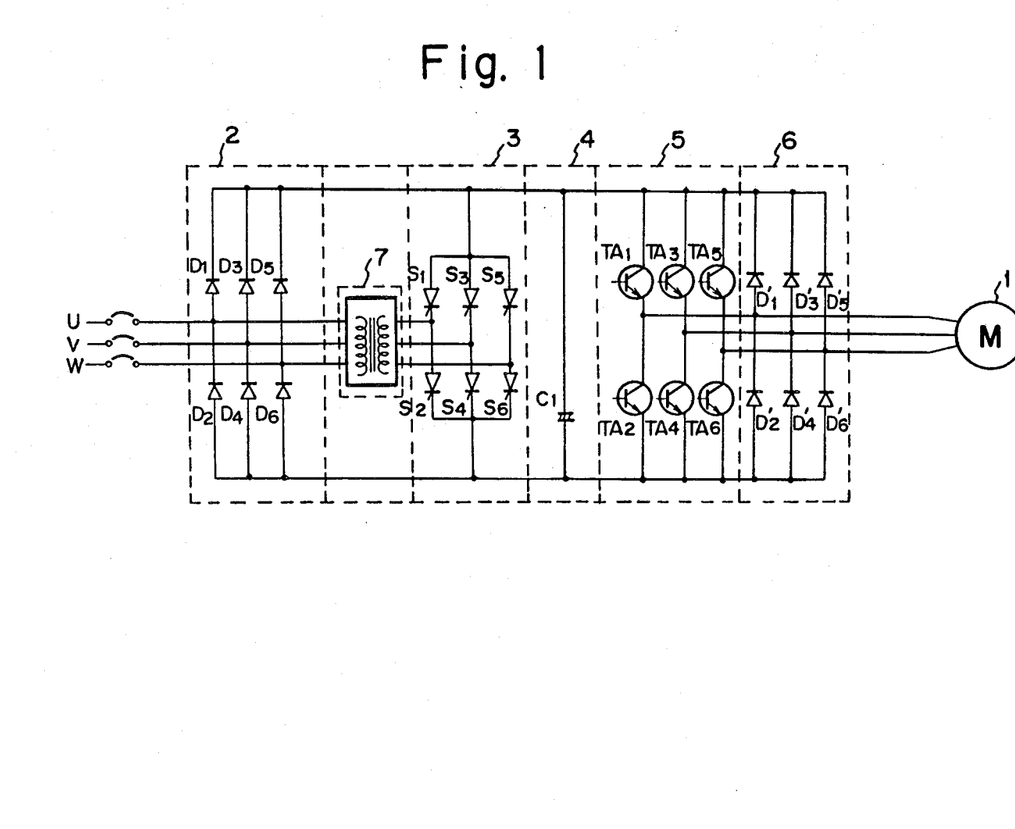
FIG. 1 is a circuit diagram of a regenerative type control apparatus for controlling the operation of an AC motor in accordance with the prior art.

A regenerative braking method, as illustrated by the circuit diagram in FIG. 1, has been proposed in an effort to improve upon the foregoing arrangements.

The apparatus includes an AC motor 1 such as a three-phase induction motor; a rectifier 2 comprising diodes $D_1$ through $D_6$ for rectifying the U, V and W phases of the AC input power; a regenerative thyristor bridge circuit 3 comprising thyristors $S_1$ through $S_6$; a smoothing circuit 4 having a capacitor $C_1$; a variable-voltage variable frequency inverter 5 comprising transistors $TA_1$ through $TA_6$; a rectifier 6 comprising diodes $D_1'$ through $D_6'$; and a step-up transformer 7 for boosting the power source voltage. To control the induction motor 1 with this conventional arrangement, for example, to reduce the motor speed, the command speed is lowered to control the voltage and frequency of the variable-voltage variable-frequency inverter 5. Thus, the synchronous speed, in conformance with the newly set frequency, becomes smaller than the motor speed, giving rise to a negative slip condition. Accordingly, the motor begins to run in the regenerative braking region, with the result that the voltage induced in the motor is rectified by the rectifier 6, thereby raising the voltage on the DC line side. The smoothing capacitor $C_1$, in order for it to exhibit the smoothing function, is charged to a voltage which is 1.3 to 1.4 times the AC power source voltage even when the motor is operating in the normal driving mode. Nevertheless, when the induction motor is operated in the regenerative region, the smoothing capacitor $C_1$ is charged to, and held at, an even higher voltage. For example, if the AC power source voltage is 200 volts, the voltage to which the capacitor $C_1$ is charged is raised to approximately 290 volts. Under such a condition, commutation cannot take place and regenerative operation is impossible because the AC power source voltage is lower than the voltage on the side of the DC line even if the firing of the regenerative thyristor bridge circuit 3 comprising thyristors $S_1$ through $S_6$ is controlled. To avoid this inconvenience the step-up transformer 7 is inserted between the thyristor bridge 3 and the AC power source, and the circuitry is arranged in such a manner that there will be intervals in which the AC power source voltage is always higher than the voltage on the DC line side. This enables operation in the regenerative braking region while assuring commutation of the thyristors $S_1$ through $S_6$. However, the apparatus that employs this system is large and expensive due to the need for the large capacity step-up transformer 7.

SUMMARY OF THE INVENTION

The present invention is directed to an inexpensive and compact operation control apparatus for an AC motor, wherein a step-up transformer is not employed for disposing of the braking energy generated by regenerative braking when the speed of the AC motor is reduced.

Accordingly, an object of the present invention is to provide an AC motor operation control apparatus equipped with a regenerative braking circuit which is cheaper and which is capable of being constructed in a much smaller size than known apparatus.

It is another object of the present invention to provide an AC motor operation control apparatus which is capable of regenerative braking without the use of a step-up transformer.

It is still another object of the present invention to provide an AC motor operation control apparatus in which stable regenerative braking can be achieved inexpensively without a large apparatus.

It is a further object of the present invention to provide an AC motor operation control apparatus equipped with a regenerative braking circuit in which transistors are turned off with ease, in which inexpensive thyristors are employed, and in which there is a high level of current efficiency.

Other features and advantages of the invention will be apparent from the following description taken in connection with the accompanying drawings.

DETAILED DESCRIPTION OF THE PREFERRED EMBODIMENT

Figure 2:
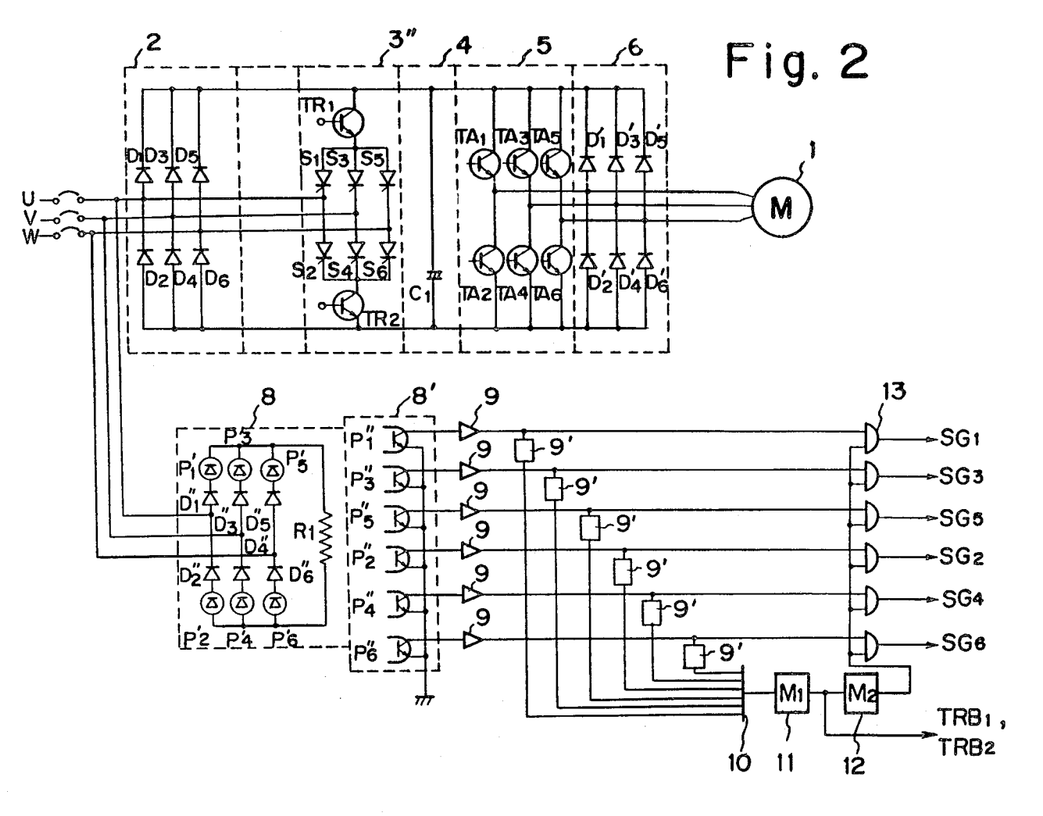
FIG. 2 is a circuit diagram of an embodiment of an apparatus for controlling the operation of an AC motor in accordance with the present invention.

Reference will now be had to FIG. 2 to describe the circuit of an embodiment of the AC motor operation control apparatus of the present invention. In FIG. 2, the sections denoted by the reference numerals 1, 2, 4, 5 and 6 are identical to those designated by the same reference numerals in FIG. 1. The section denoted by numeral 3" corresponds to the regenerative thyristor bridge circuit 3 of FIG. 2 but in this case it is a regenerative compound bridge circuit which is constructed by connecting the regenerative thyristor bridge circuit, comprising the bridge-connected thyristors $S_1$ through $S_6$, between the DC lines through switching transistors $TR_1$ and $TR_2$. Shown at numeral 8 is one of two elements which constitute a photocoupler. Elements such as light-emitting diodes are shown at $P_1'$ through $P_6'$, and diodes at $D_1''$ through $D_6''$. The light-emitting diodes $P_1'$ through $P_6'$ and diodes $D_1''$ through $D_6''$ are connected to form a bridge circuit whose AC input side receives the three-phase AC power for the motor in a phase relationship which corresponds to that of the respective thyristors in the regenerative compound thyristor bridge circuit 3" that receive the three phases U, V and W. The diodes $D_1''$ through $D_6''$ serve also to protect the circuit against reverse voltage. The other element which constitutes the photocoupler is shown at reference numeral 8' and consists of, for example, phototransistors $P_1''$ through $P_6''$. The arrangement is such that when light-emitting diode $P_1'$ emits light in response to an inflow of current, the element $P_1''$, serving as a light receiver, is rendered conductive by receiving the emitted light. The output terminal of each light-receiving element $P_1''$ through $P_6''$ is provided with an inverter 9 for inverting the output signal. The output signals from the inverters 9 are respectively applied to a corresponding differential circuit 9' which generates a pulse at the leading edge of the output signal from the inverter 9. The pulses from the differential circuits 9' are applied to an OR circuit 10 whose output is in turn coupled to a first monostable multivibrator circuit 11 which generates negative pulses of a fixed time width. A second monostable multivibrator circuit 12 responds to the output of the first monostable multivibrator circuit 11 also to produce pulses of a fixed time width.

AND circuits 13 take the logical AND between the outputs of the respective inverters 9 and the output of the second monostable multivibrator 12, and correspond in number to the inverters 9. The outputs of the AND circuits 13 are second firing control signals $SG_1$ through $SG_6$, serving as gate signals, which are applied to the gates of corresponding ones of the thyristors $S_1$ through $S_6$ that form the regenerative compound thyristor bridge circuit 3". The output of the first monostable multivibrator circuit 11 is a first firing control signal, serving as a base signal, which is applied simultaneously as signals $TRB_1$, $TRB_2$ to the switching transistors $TR_1$, $TR_2$ connected in series with the thyristor group in the regenerative compound thyristor bridge circuit 3".

The elements 8, 8' that construct the photocoupler, the inverters 9, the differential circuits 9', the OR circuit 10, the monostable multivibrators 11 and 12, and the AND circuits 13 construct a firing control circuit for the regenerative compound thyristor bridge circuit 3". In addition, the photocoupler elements 8, 8' and the inverters 9 form a phase signal forming circuit; the differential circuit 9', the OR circuit 10 and the first monostable multivibrator circuit 11 construct a first firing control signal generating circuit for forming firing control signals for the transistors $TR_1$, $TR_2$ in the regenerative thyristor bridge circuit 3"; and the second monostable multivibrator circuit 12 and AND circuits 13 construct a second firing control signal generating circuit for forming firing control signals for the thyristors $S_1$ through $S_6$ of the regenerative thyristor bridge circuit 3".

In operation, when the AC motor 1, comprising the induction motor, is running in the ordinary driving mode, each phase of the AC power source is rectified into a direct current by the rectifier 2. The variable-voltage variable frequency inverter 5 converts the direct current into an alternating current of a prescribed frequency and voltage which is supplied to the induction motor 1 to bring the motor speed into agreement with the command speed. The output frequency of the inverter 5 can be varied by adjusting the repetition frequency of the firing pulses applied to the transistor elements $TA_1$ through $TA_6$ of the inverter, and the output voltage of the inverter 5 is capable of being varied by adjusting the conduction time of the transistor elements $TA_1$ through $TA_6$. When a speed reduction command signal is applied at such time that it is required to reduce the speed of the motor in accordance with the load, the output voltage and frequency of the variable-voltage variable-frequency inverter 5 are decreased, so that the rotational speed of the operating motor at this time is higher than the synchronous speed which conforms to the new operating frequency. As a result, the induction motor 1 operates in a region where the slip is negative, that is, in a regenerative braking region, so that the output of the motor raises the voltage on the DC line side upon being rectified by the rectifier 6. Thus, if the motor is operating at an AC power source voltage of 200 volts, the voltage at the terminals of the smoothing capacitor $C_1$ will be raised to approximately 290 volts. If the regenerative bridge circuit were composed solely of the thyristors $S_1$ through $S_6$ as in the prior art, the thyristors would fail to commute even though the intent is for regenerative braking to occur by firing the thyristors which are connected to the two phases of the AC power source that exhibit the largest interphase voltage at that time. Such commutation failure short-circuits the power source and can destroy the equipment. In contrast, according to the present invention, the switching transistors $TR_1$, $TR_2$ are connected in series with the thyristor group of the regenerative bridge circuit and are rendered conductive during regenerative operation, and momentarily non-conductive at the same time when any of the thyristors $S_1$ through $S_6$ is to commute, thereby to interrupt the flow of current to the thyristors. The transistors $TR_1$, $TR_2$ are then fired again after taking into account the time during which all of the thyristors are to be turned off. In this way the regenerative current is always fed back to the power source without any of the thyristors experiencing commutation failure even though the voltage on the DC line side is higher than the AC voltage of the power source.

Figure 3A:
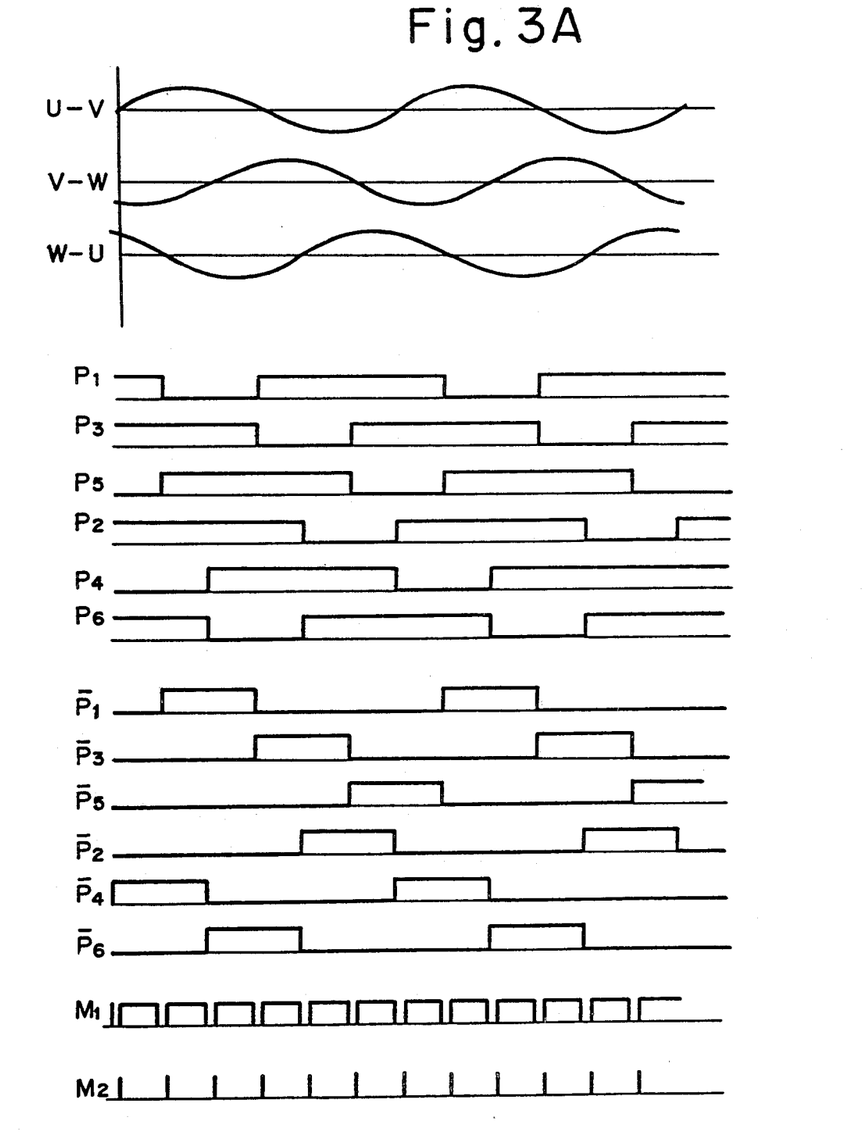
FIGS. 3A and 3B are waveform diagrams which illustrate waveforms associated with the various portions of the circuit shown in FIG. 2.
Figure 3B:
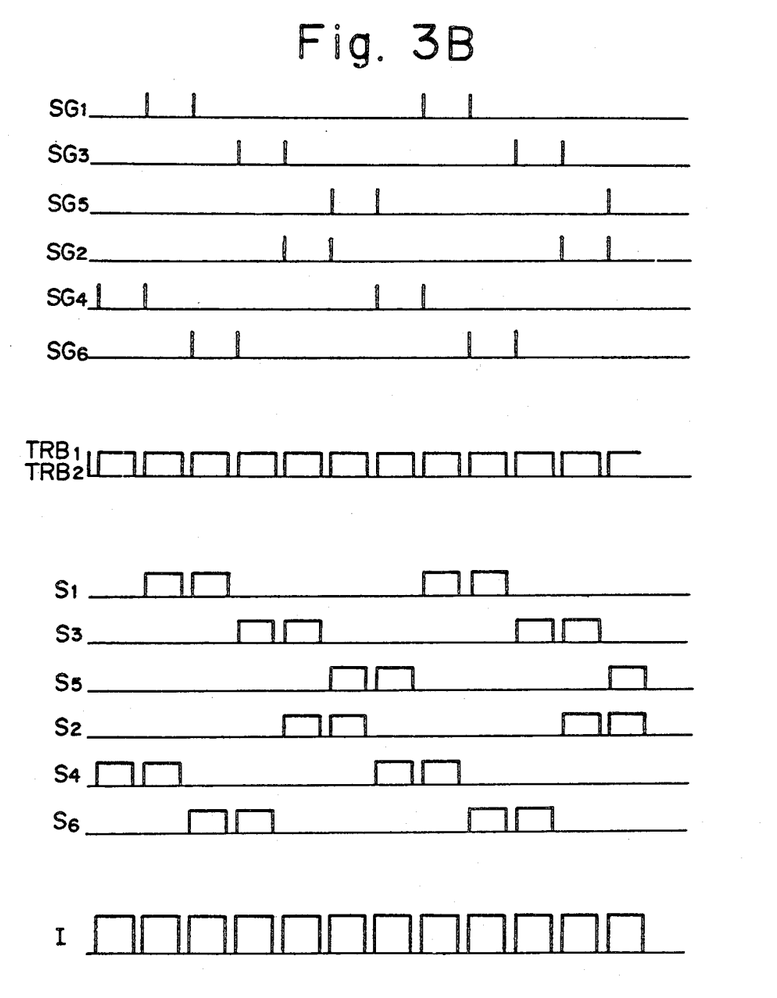

The formation of the control signals that make the foregoing operation possible will now be described. The input side of the bridge circuit 8, comprising one of the photocouplers composed of the elements $P_1'$ through $P_6'$ such as light-emitting diodes, is connected to the U, V and W-phases of the motor driving source. With such a connection the bridge circuit 8 and the regenerative thyristor bridge circuit 3" receive phase voltages of the same phase, so that it is possible to detect the phase corresponding to that at which firing must occur when the regenerative thyristor bridge circuit 3" is to operate in the regenerative mode. This will be described in connection with FIG. 3A. Sinusoidal phase voltages U-V, V-W, and W-U are impressed upon the corresponding phase input terminals of the bridge that forms the photocoupler. A current flows only into that light-emitting diode that receives the largest phase voltage of those that are applied, that particular diode responding by emitting light for the duration of the current flow. The light-emitting diodes $P_1'$ through $P_6'$ are actuated in succession in accordance with the time variation of the interphase voltages. The other photocoupler element 8' is arranged so as to intercept the light from the light-emitting diodes. Hence, when the diodes are actuated and caused to emit light, the light-receiving elements (such as phototransistors) that constitute the photocoupler 8' intercept the light from corresponding ones of the light-emitting diodes and are rendered conductive, their collector potentials going to zero volts and remaining there for as long as they continue to receive light. The outputs of the phototransistors $P_1''$, $P_2''$, $P_3''$, $P_4''$, $P_5''$ and $P_6''$ are illustrated by the respective waveforms $\overline{P}_1$, $\overline{P}_2$, $\overline{P}_3$, $\overline{P}_4$, $\overline{P}_5$ and $\overline{P}_6$ of FIG. 3A. The signals $P_1$ through $P_6$ are inverted to produce the phase signals $P_1$, $P_2$, $P_3$, $P_4$, $P_5$ and $P_6$ by means of the inverters 9 connected to the output of each phototransistor. The inverted phase signals are applied to one input terminal of the corresponding AND circuits 13, and to the input side of the OR circuit 10. Accordingly, the OR circuit 10 successively delivers pulses to the monostable multivibrator circuit 11, a pulse being produced each time a pulse in the signals $\overline{P}_1$ through $\overline{P}_6$ arrives. The monostable multivibrator circuit 11 is triggered by the leading edge of each received pulse and is rendered conductive for a fixed period of time only, after which the output of the multivibrator returns to its original potential, this operation continuing in repetitive fashion to produce the pulse train $M_1$ in FIG. 3A. The pulse train has a zero potential with approximately 0.5-millisecond intervals which correspond to the conductive intervals of the multivibrator. This zero-potential pulse train is applied as first firing control signals $TRB_1$, $TRB_2$ to the bases of switching transistors $TR_1$, $TR_2$ which are connected in series with the regenerative thyristor bridge circuit, and functions to bring the base potentials of the transistors to zero potential to render the transistors non-conductive. In addition, this pulse train is also applied to the second monostable multivibrator circuit 12 which responds by producing the pulse train $M_2$ in FIG. 3A. The pulses are positive pulses having a pulse width of approximately 10 microseconds and they are timed by the leading edge of each input pulse as it returns to its original potential. The pulses $M_2$ are applied to each of the AND circuits 13. The AND circuits 13 take the logical AND between the phase signals $\overline{P}_1$ through $\overline{P}_6$, obtained from the inverters 9, and the output pulses $M_2$ from the second multivibrator circuit 12, thereby producing the second firing control signals $SG_1$, $SG_2$, $SG_3$, $SG_4$, $SG_5$ and $SG_6$ which are delivered to the gates of the thyristors $S_1$ through $S_6$ that construct the regenerative thyristor bridge circuit. The phase relationship among the signals $SG_1$ through $SG_6$, as shown in FIG. 3B, is of course regulated by the output signals $P_1$ through $P_6$ of the photocoupler.

Accordingly, let it be assumed that the U-V phases of the AC power source exhibit the largest interphase voltage suited for regeneration. When the zero-potential pulse signals $TRB_1$, $TRB_2$ of FIG. 3B are applied to the switching transistors $TR_1$, $TR_2$ of the regenerative thyristor bridge circuit 3", the transistors $TR_1$, $TR_2$ are rendered non-conductive simultaneously to temporarily cut off the flow of current to the thyristor bridge circuit 3", thereby turning off all of the thyristors $S_1$ through $S_6$. After this occurs the second firing control signals $SG_1$ and $SG_4$ applied to the gates of thyristors $S_1$ and $S_4$ which are fired as a result. Hence a regenerative current I flows from the U-phase of the power source to the V-phase to feed back the energy. After a prescribed time period the zero-potential pulses are re-applied to the switching transistors $TR_1$, $TR_2$ to render them non-conductive, thereby again turning off all of the thyristors in the regenerative thyristor bridge circuit 3". Then the switching transistors $TR_1$, $TR_2$ are again rendered conductive, and at the same time the second firing control signals $SG_1$ and $SG_6$ are applied to thyristors $S_1$ and $S_6$, so that the regenerative current can flow from the U-phase to the W-phase of the power source. Thereafter, the operation continues in similar fashion. Thus, all of the thyristors are turned off by rendering both switching transistors $TR_1$, $TR_2$ non-conductive by applying the zero-potential pulses, namely the first firing control signals $TRB_1$, $TRB_2$, to the switching transistors prior to the commutation of the thyristors. Then, in successive intervals during which the switching transistors are non-conductive, the second firing control signals $SG_3$ and $SG_6$ are applied to the thyristors $S_3$ and $S_6$, the second firing control signals $SG_3$ and $SG_2$ are applied to the thyristors $S_3$ and $S_2$, and the second firing control signals $SG_5$ and $SG_2$ are applied to the thyristors $S_5$ and $S_2$. As a result, a regenerative current can be supplied between the two phases of the AC power source that exhibit the largest interphase voltage. In addition, commutation can take place in a reliable manner since the thyristors are turned off temporarily prior to the arrival of the second firing control signals due to the fact that the current is interrupted without fail by the switching transistors $TR_1$, $TR_2$. The conduction of the thyristors $S_1$ through $S_6$ and the regenerative current waveforms based on the foregoing operation are illustrated by $S_1$ through $S_6$ and by I, respectively, in FIG. 3B.

The present invention, as described in detail above, allows regenerative braking to be applied to an AC motor such as an induction motor so that a highly efficient braking action can be achieved, and permits comparatively inexpensive thyristors to be employed as the elements that construct the regenerative bridge. In addition, only two switching transistors, which have a high cost per unit of current capacity, need be connected in series between the DC lines and the regenerative bridge to enable reliable commutation and stable operational control without regard to the size of the AC power source interphase voltage. Therefore it is not necessary to provide the step-up transformer for commutation which was an essential component in the prior art, nor is it required to construct the regenerative bridge entirely of switching elements. This is commercially advantageous since the size and cost of the apparatus can be reduced.

As many widely different embodiments of the present invention may be made without departing from the spirit and scope thereof, it is to be understood that the invention is not limited to the specific embodiments thereof except as defined in the appended claims.

What we claim is:

1. An apparatus for controlling the operation of an AC motor, said apparatus connected to a three-phase AC power source, said apparatus comprising:
    means for receiving an externally applied command signal;
    a rectifier, connected to the three-phase AC power source, for converting alternating current into direct current;
    a variable-voltage variable-frequency inverter, operatively connected to said rectifier, for applying drive signals to the AC motor upon receiving the direct current output of said rectifier, said drive signals having a supply voltage and frequency which are varied in accordance with the externally applied command signal;
    first and second switching transistors operatively connected between said inverter and said rectifier;
    a thyristor bridge circuit for regenerative action operatively connected in series between said first and second switching transistors;
    a smoothing capacitor operatively connected in parallel with said variable-voltage variable-frequency inverter; and
    a firing control circuit, operatively connected to the three-phase AC power source, said thyristor bridge circuit and to said first and second switching transistors, for controlling the firing of each thyristor in said thyristor bridge circuit, and for controlling the switching action of said first and second switching transistors in synchronism with the firming of the thyristors, said firing control circuit comprising:
        a phase signal forming circuit, operatively connected to the three-phase AC power source, for forming a plurality of phase signals on the basis of the three-phase AC power source;
        a first firing control signal generating circuit, operatively connected to said phase signal forming circuit and to said first and second switching transistors, responsive to the phase signals formed by said phase signal forming circuit to generate first firing control signals for controlling the on-off action of said first and second switching transistors; and
        a second firing control signal generating circuit, operatively connected to said phase signal forming circuit, said first firing control signal generating circuit and said thyristor bridge rectifier circuit, responsive to the phase signals formed by said phase signal forming circuit to generate second firing control signals for controlling the firing of said thyristors.

2. Apparatus as set forth in claim 1, wherein said firing control circuit controls the firing of the ones of the thyristors in said thyristor bridge circuit that are connected to the two phases of the three-phase AC power source which exhibit the largest interphase voltage.

3. Apparatus as set forth in claim 1, wherein said second firing control signal generating circuit has a control input for receiving the first firing control signals.

4. Apparatus as set forth in claim 1, wherein said phase signal forming circuit includes a photocoupler for receiving the three-phase power from the three-phase AC power source and for generating phase signals having six phases, and wherein said photocoupler comprises a light-emitting diode bridge circuit connected to the three-phase AC voltage source and phototransistors operatively positioned adjacent said light-emitting diode bridge circuit.

5. Apparatus for controlling the operation of an AC motor, said apparatus connected to a three-phase AC power source and to means for generating a command signal, said apparatus comprising:
    first rectifier means, operatively connected to the three-phase AC power source, for converting alternating current into direct current, said first rectifier means having an output;
    a first switching transistor operatively connected to the output of said first rectifier means at a first node;
    a second switching transistor operatively connected to the output of said first rectifier means at a second node;
    thyristor bridge means operatively connected in series between said first and second switching transistors and operatively connected to the three-phase AC power source, said thyristor bridge means for regenerative action;
    a smoothing capacitor having electrodes operatively connected at said first and second nodes;
    variable-voltage variable-frequency inverter means operatively connected to said smoothing capacitor at said first and second nodes, to the means for generating a command signal and to the AC motor, for applying drive signals to the AC motor in dependence upon the direct current output of said first rectifier means, said drive signals having a voltage and frequency which are varied in accordance with the command signal; and
    firing control means, operatively connected to the AC power source, said first and second switching transistors and the gates of the thyristors of said thyristor bridge means, for controlling the firing of each of the thyristors and for controlling the switching action of said first and second switching transistors in synchronism with the firing of the thyristors, said firing control means comprising:
        phase signal forming means, operatively connected to the three-phase AC power source, for forming phase signals in dependence upon the three-phase AC power source;

first firing control signal generating means, operatively connected to said phase signal forming means and said first and second switching transistors, for generating first firing control signals for controlling the switching action of said first and second switching transistors in dependence upon said phase signals; and second firing control signal generating means, operatively connected to said phase signal forming means, said first firing control signal generating means and said thyristor bridge means, for generating second firing control signals for controlling the firing of said thyristors in dependence upon said phase signals and said first firing control signals, whereby braking energy is fed back to the AC power source side of said rectifier means.

6. Apparatus as set forth in claim 5, wherein said firing control means controls the firing of the thyristors in said thyristor bridge means which are connected to the two phases of the AC power source having the largest interphase voltage.

7. Apparatus as set forth in claim 5, wherein said phase signal forming means comprises a photocoupler circuit connected to the three-phase AC power source for receiving the three-phase power from the three-phase AC power source and for generating phase signals having six phases.

8. Apparatus as set forth in claim 7, wherein said first firing control signal generating means comprises:
a plurality of differential circuits, operatively connected to said photocoupler circuit, for generating a plurality of differential pulse signals;
an OR gate operatively connected to said plurality of differential circuits and having said plurality of differential pulse signals as inputs, said OR gate for producing an OR output signal; and
a first monostable multivibrator circuit, operatively connected to said first and second switching transistors, said OR gate and said second firing control signal generating means, for generating said first firing control signal.

9. Apparatus as set forth in claim 8, wherein said second firing control signal generating means comprises:
a second monostable multivibrator circuit connected to the output of said first monostable multivibrator circuit; and
a plurality of AND gates operatively connected to said photocoupler circuit, said plurality of AND gates having inputs comprising the output of said second monostable multivibrator circuit and the outputs of said photocoupler, said AND gates generating, as outputs, said second firing control signals.

10. Apparatus as set forth in claim 4, wherein said first firing control signal generating circuit comprises:
a plurality of differential circuits operatively connected to said phototransistors, for generating a plurality of differential pulse signals;
an OR gate, operatively connected to said plurality of differential circuits, for receiving, as inputs, said plurality of differential pulse signals and for generating an OR output signal; and
a first monostable multivibrator circuit, operatively connected to said first and second switching transistors, said OR gate and said second firing control signal generating circuit, for generating said first firing control signal.

11. Apparatus as set forth in claim 10, wherein said second firing control signal generating circuit comprises:
a second monostable multivibrator circuit connected to the output of said first monostable multivibrator circuit; and
a plurality of AND gates operatively connected to said phototransistors, said plurality of AND gates having inputs comprising the output of said second monostable multivibrator circuit and the outputs of said phototransistors, said AND gates generating, as outputs, said second firing control signals.

* * * * *

UNITED STATES PATENT AND TRADEMARK OFFICE
CERTIFICATE OF CORRECTION

PATENT NO. : 4,353,023
DATED : OCTOBER 5, 1982
INVENTOR(S) : SHIGEKI KAWADA ET AL.

It is certified that error appears in the above-identified patent and that said Letters Patent is hereby corrected as shown below:

Column 4, line 36, "variable frequency" should be

--variable-frequency--.

Signed and Sealed this

Fifteenth Day of February 1983

[SEAL]

Attest:

GERALD J. MOSSINGHOFF

Attesting Officer   Commissioner of Patents and Trademarks